US012637584B2

(12) United States Patent
Zhang et al.

(10) Patent No.: US 12,637,584 B2
(45) Date of Patent: May 26, 2026

(54) WATERBORNE POLYURETHANE-EPOXY RESIN BASED PRIMER COMPOSITION AND ITS PREPARATION METHOD THEREOF

(71) Applicant: BASF Coatings GmbH, Müenster (DE)

(72) Inventors: Yu Bo Zhang, Pudong (CN); Pei Hai Cong, Pudong (CN); Benjamin Delespierre, Guangzhou (CN); Qi Yun Zhou, Pudong (CN)

(73) Assignee: BASF COATINGS GMBH, Muenster (DE)

( * ) Notice: Subject to any disclaimer, the term of this patent is extended or adjusted under 35 U.S.C. 154(b) by 513 days.

(21) Appl. No.: 18/260,372

(22) PCT Filed: Jan. 6, 2022

(86) PCT No.: PCT/EP2022/050194

§ 371 (c)(1),
(2) Date: Jul. 5, 2023

(87) PCT Pub. No.: WO2022/148805

PCT Pub. Date: Jul. 14, 2022

(65) Prior Publication Data

US 2024/0076519 A1 Mar. 7, 2024

(30) Foreign Application Priority Data

Jan. 11, 2021 (WO) ................ PCT/CN2021/071087

(51) Int. Cl.

| | |
|---|---|
| ***C09D 175/04*** | (2006.01) |
| ***C08G 18/54*** | (2006.01) |
| ***C08G 18/58*** | (2006.01) |
| ***C08G 18/67*** | (2006.01) |
| ***C08G 18/79*** | (2006.01) |
| ***C09D 5/00*** | (2006.01) |

(52) U.S. Cl.

CPC ......... *C09D 175/04* (2013.01); *C08G 18/542* (2013.01); *C08G 18/581* (2013.01); *C08G 18/672* (2013.01); *C08G 18/79* (2013.01); *C09D 5/002* (2013.01)

(58) Field of Classification Search

CPC ................ C09D 175/04; C08G 18/542; C08G 18/581; C08G 18/672; C08G 18/79

See application file for complete search history.

(56) References Cited

FOREIGN PATENT DOCUMENTS

| | | |
|---|---|---|
| CN | 110003771 A | 7/2019 |
| CN | 110655855 A | 1/2020 |

OTHER PUBLICATIONS

Machine Translation of Cui et al. (CN 110655855 A) (Year: 2020).*
International Search Report and Written Opinion for corresponding PCT/EP22/50194, mailed Apr. 20, 2022, 9 pages.

* cited by examiner

*Primary Examiner* — Callie E Shosho
*Assistant Examiner* — Bethany M Miller
(74) *Attorney, Agent, or Firm* — Armstrong Teasdale LLP

(57) ABSTRACT

Disclosed herein is a waterborne polyurethane-epoxy resin-based primer composition and its preparation method. Further disclosed herein is a primer layer obtained from curing the waterborne polyurethane-epoxy resin-based primer composition on substrates as well as a method of curing the primer composition on substrates.

20 Claims, No Drawings

WATERBORNE POLYURETHANE-EPOXY RESIN BASED PRIMER COMPOSITION AND ITS PREPARATION METHOD THEREOF

CROSS-REFERENCE TO RELATED APPLICATIONS

This application is a U.S. National Phase Application of International Patent Application No. PCT/EP2022/050194, filed Jan. 6, 2022, which claims priority to Patent Application No. PCT/CN2021/071087, filed Jan. 11, 2021, each of which is hereby incorporated by reference herein.

TECHNICAL FIELD

The invention relates to a waterborne polyurethane-epoxy resin based primer composition and its preparation method. The invention also relates to a primer layer obtained by curing the waterborne polyurethane-epoxy resin based primer composition according to the present invention on substrates and a method of curing said primer composition on substrates.

BACKGROUND

The current industrial coating products are mainly organic solvent based that release VOCs (volatile organic compounds) harmful for both environment and health. To comply with increasingly strict regulations on VOCs, more environmental-friendly coatings are developed such as waterborne coatings.

When coating layers are applied onto large mechanical equipments, a so-called wet-on-wet process is used to accelerate the painting procedures. Said wet-on-wet process is a coating process which omits intermediate drying steps of each layer when spraying multiple coating layers. Waterborne coatings in prior art are not so adaptive to wet-on-wet process due to their slow drying speed and as a result, the coating layers obtained from wet-on-wet process have problems of low gloss, foaming, poor adhesion and low hardness etc.

CN110003771A disclosed a waterborne coating system that could be applied in wet-on-wet process. Said coating system comprises a epoxy-based primer and a polyurethane-based topcoat. The drying speed of said epoxy-based primer is quite slow in both surface and inside, especially in wet and cold weather. As a result, the obtained coating layers have drawbacks in performances such as mechanical properties, water and chemical resistance etc.

Therefore, it is still required to develop a waterborne primer applicable for wet-on-wet process to produce coating layers having good appearance and performances.

SUMMARY OF THE INVENTION

This invention provides a waterborne primer composition applicable for wet-on-wet process and its preparation method. The invented primer composition brings advantages of low VOC, high storage stability, workability, anti-sagging, fast drying speed, strong adhesion force, water and chemical resistance and so on.

This invention provides a waterborne polyurethane-epoxy resin based primer composition comprising:

(A) a paint composition comprising, based on the total weight of Component (A):

from 37% to 50% by weight of hydroxyl functional acrylic-epoxy resin, from 3% to 10% by weight of hydrocarbon resin containing at least one phenolic hydroxyl group, from 5% to 15% by weight of a cosolvent for Component (A), and from 30% to 50% by weight of powder slurry; and (B) a hardener composition comprising, based on the total weight of Component (B):

from 40% to 60% by weight of a polyisocyanate, from 30% to 59% by weight of a cosolvent for Component (B), and from 1% to 10% by weight of adhesion promoter;

wherein the weight ratio of Component (A) to Component (B) is 2:1 to 15:1.

The invention also provides a method of preparing the invented primer composition.

Furthermore, this invention provides a method of curing the invented waterborne polyurethane-epoxy resin based primer composition on substrates as well as the obtained coating layers after curing on substrates.

DETAILED DESCRIPTION OF THE INVENTION

In one aspect, the present invention provides a waterborne polyurethane-epoxy resin based primer composition comprising:

(A) a paint composition comprising, based on the total weight of Component (A):

from 37% to 50%, preferably from 38% to 48% and more preferably from 39% to 45% by weight of hydroxyl functional acrylic-epoxy resin, from 3% to 10%, preferably from 3.2% to 8% and more preferably from 3.5% to 5.5% by weight of hydrocarbon resin containing at least one phenolic hydroxyl group, from 5% to 15%, preferably from 6% to 10% and more preferably from 7% to 8% by weight of a cosolvent for Component (A), and from 30% to 50%, preferably from 35% to 49% and more preferably from 39% to 48% by weight of powder slurry; and (B) a hardener composition comprising, based on the total weight of Component (B):

from 40% to 60%, preferably from 42% to 55% and more preferably from 45% to 50% by weight of a polyisocyanate, from 30% to 59%, preferably from 35% to 54% and more preferably from 42% to 50% by weight of a cosolvent for Component (B), and from 1% to 10%, preferably from 3% to 8% and more preferably from 4% to 6% by weight of adhesion promoter;

wherein the weight ratio of Component (A) to Component (B) is from 2 to 15, preferably from 3 to 10 and more preferably from 4 to 8.

In one embodiment, the hydroxyl functional acrylic-epoxy resin in Component (A) is a copolymer of a glycidyl ether (meth)acrylate and at least one olefinic and/or aromatic monomer.

The glycidyl ether (meth)acrylate is preferably a reaction product of glycidyl ether and (meth) acrylic acid. Suitable glycidyl ether is, for example, aromatic glycidyl ether or aliphatic glycidyl ether, preferably aromatic glycidyl ether. Aromatic glycidyl ether is, for example, at least one selected from a group consisting of bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4,7-methano-5H-indene (CAS No. [13446-85-0]), tris[4-(2,3-epoxypropoxy) phenyl]methane isomers (CAS No. [66072-39-7]), phenol-based epoxy novolaks (CAS No. [9003-35-4]) and cresol-based epoxy novolaks (CAS No. [37382-79-9]), preferably bisphenol A diglycidyl ether. Aliphatic glycidyl ether is, for example, at least one selected from a group consisting of 1,4-butanediol diglycidyl ether, 1,6-hexanediol diglycidyl ether, trimethylolpropane triglycidyl ether, pentaerythrityl tetraglycidyl ether, diglycidyl ether of polypropylene glycol (α,ω-bis(2,3-epoxypropoxy)poly(oxypropylene) (CAS No. [16096-30-3])) and diglycidyl ether of hydrogenated bisphenol A (2,2-bis[4-(2,3-epoxypropoxy)cyclohexyl]propane (CAS No. [13410-58-7])).

The olefinic and/or aromatic monomer is at least one selected from a group consisting of (meth)acrylic acid, (meth)acrylic ester other than glycidyl ether (meth)acrylate, α-methyl styrene, styrene, maleic anhydride, itaconic acid and itaconic esters, preferably at least one selected from a group consisting of 2-hydroxyethyl (meth)acrylate, 3-hydroxypropyl (meth)acrylate, 4-hydroxybutyl (meth)acrylate, methyl (meth)acrylate, ethyl (meth)acrylate, n-propyl (meth)acrylate, iso-propyl (meth)acrylate, n-butyl (meth) acrylate, iso-butyl (meth)acrylate, tertbutyl (meth)acrylate, n-amyl (meth)acrylate, iso-amyl (meth)acrylate, isobornyl (meth)acrylate, n-hexyl (meth)acrylate, 2-ethylbutyl (meth) acrylate, 2-ethylhexyl (meth)acrylate, n-octyl (meth)acrylate, n-decyl (meth)acrylate, methylcyclohexyl (meth)acrylate, cyclopentyl (meth)acrylate, cyclohexyl (meth)acrylate, sec-butyl (meth)acrylate, cinnamyl (meth)acrylate, crotyl (meth)acrylate, 2-ethoxyethyl (meth)acrylate, α-methyl styrene and styrene.

Preferably, the hydroxyl functional acrylic-epoxy resin comprises hydroxyl groups in an amount of from 1.0% to 10.0% by weight, preferably from 2.0% to 7.0% by weight and more preferably from 3.0% to 4.0% by weight, based on the total weight of the hydroxyl functional acrylic-epoxy resin. Preferably, the hydroxy acrylic-epoxy resin has an epoxy equivalent in a range of from 500 to 2500 g/eq, preferably from 1000 to 2000 g/eq and more preferably from 1300 to 1800 g/eq. Preferably, the hydroxy acrylic-epoxy resin has a T-4 cup viscosity of from 30 to 100 s, preferably from 40 to 80 s and more preferably from 45 to 75 s.

Particularly preferred is a hydroxyl functional acrylic-epoxy resin having a structure as illustrated in Formula (I):

Formula (I)

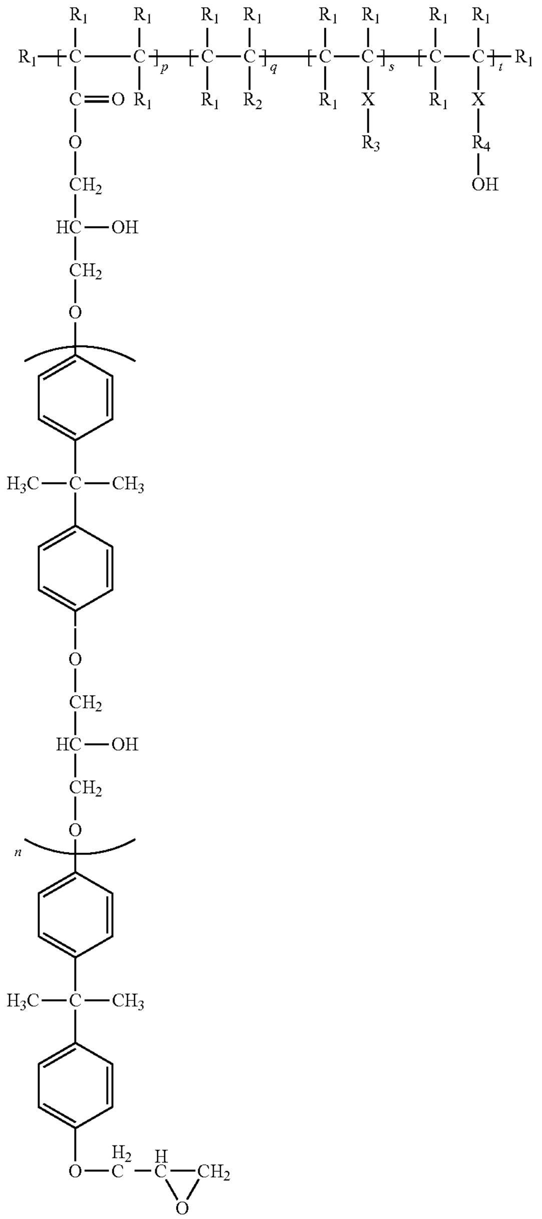

wherein $R_1$ is independently hydrogen, methyl or ethyl group; $R_2$ is substituted or unsubstituted aryl group; $R_3$ is $C_1$-$C_6$ alkyl group; $R_4$ is $C_1$-$C_6$ alkylene group; X is ester or ether segment; p, q, s, t are positive integers and the sum of p, q, s and t is from 4 to 120, preferably from 8 to 80 and more preferably from 20 to 60; n is an integer from 0 to 10, preferably from 1 to 8 and more preferably from 2 to 5.

More preferred is a hydroxyl functional acrylic-epoxy resin having a structure as illustrated in the above Formula (I), wherein $R_1$, $R_2$, $R_3$, $R_4$, X and n are the same as defined in the above Formula (I); p, q, s, t are equal positive integers and either p or q or s or t is from 1 to 30, preferably from 2 to 20 and more preferably from 5 to 15.

The hydrocarbon resin containing at least one phenolic hydroxyl group is known in principle and described by way of example in Ullmanns Encyklopaidie der technischen Chemie, 4th Edition, Volume 12, pp. 539 to 545, (Verlag Chemie, Weinheim 1976), Kirk-Othmer, Encyclopedia of Chemical Technology, 3rd Edition, Volume 12, pp. 852 to 869, (John Wiley & Sons, New York 1980) or Encyclopedia of Polymer Science and Engineering, Vol. 7, pp. 758 to 782, (John Wiley & Sons, New York 1987). Examples of suitable hydrocarbon resin containing at least one phenolic hydroxyl group are at least one selected from a group consisting of coumarone-indene resin, petroleum resin and terpene resin.

Hydrocarbon resin of this kind containing at least one phenolic hydroxyl group is typically prepared by copolymerizing unsaturated hydrocarbon of the type specified below with phenol and/or alkylated phenols such as cresols in the presence of strong acids or catalysts of the Friedel-Crafts type. Suitable unsaturated hydrocarbon for preparing the OH-functional hydrocarbon resin which can be used in accordance with the invention are the hydrocarbon obtained in the cracking of naphtha or gas oil, such as butene, butadiene, pentene, piperylene, isoprene, cyclopentadiene, styrene, α-methylstyrene, vinyltoluene, dicylopentadiene, methyldicyclopentadiene, indene or methylindene, for example. Further suitable unsaturated hydrocarbon includes terpenes, such as α-pinene, β-pinene, dipentene, D-limonene or turpentine.

Examples of suitable hydrocarbon resin are available commercially under the trade name Novares® from Rütgers, Duisburg, Germany or Nevoxy® from Neville Chemical Europe Polymers BV, Uithoom, the Netherlands.

Preferably, the hydrocarbon resin containing at least one phenolic hydroxyl group is a $C_9$ petroleum resin obtained by hydrophilic modification.

Further preferably, the hydrophilically modified petroleum resin is Novares W, Rütgers.

Preferably, the cosolvent for Component (A) is a mixture of hydrophilic and lipophilic solvents in a ratio by weight of from 1 to 10, preferably from 1 to 8 and more preferably from 1 to 5, wherein said hydrophilic solvent is at least one selected from a group consisting of propylene glycol methyl ether, dipropylene glycol butyl ether and dipropylene glycol methyl ether, and said lipophilic solvent is at least one selected from a group consisting of propylene glycol butyl ether, trimethylbenzenes and tetramethylbenzenes. Further preferably, the combination of hydrophilic solvent and lipophilic solvent is a combination of propylene glycol methyl ether and/or dipropylene glycol butyl ether and propylene glycol butyl ether and/or trimethylbenzenes, preferably a combination of dipropylene glycol butyl ether and tetramethylbenzenes.

Preferably, Component (A) may further comprise 0.5 to 5% of an adjuvant, based on the total weight of Component (A). The adjuvant is at least one of a defoamer, a substrate wetting agent, a thickener and a flash rusting inhibitor.

Preferably, the defoamer used in Component (A) is a non-silicon based defoamer, such as TEGO-830, TEGO.

Preferably, the substrate wetting agent used in Component (A) is a dual function substrate wetting agent that has both substrate wetting and leveling, such as at least one of TEGO-410, TEGO-425, TEGO-450, TEGO, and the like.

Preferably, the thickener used in Component (A) is an associative polyurethane thickener, such as at least one of ELEMENTIS RHEOLATE 299, FX1070, FX1010, TEGO-3030, Rohm & Haas RM-8W, etc.

Preferably, the flash rusting inhibitor used in Component (A) is an aminocarboxylate, such as Flash-X-150, HALOX.

The powder slurry of Component (A) comprises, based on the total weight of the powder slurry:

from 0.5% to 5%, preferably from 1% to 4% and more preferably from 1.5% to 3% by weight of a dispersant;

from 0.05% to 2%, preferably from 0.1% to 1% and more preferably from 0.2% to 0.8% by weight of a defoamer;

from 1% to 8%, preferably from 2% to 6% and more preferably from 2.5% to 5.5% by weight of a cosolvent for the powder slurry;

from 0.1% to 1.2%, preferably from 0.4% to 0.8% and more preferably from 0.5% to 0.7% by weight of an anti-settling agent;

from 5% to 18%, preferably from 7% to 15% and more preferably from 8% to 12% by weight of an anti-rusting pigment;

from 13% to 21%, preferably from 14% to 19% and more preferably from 15% to 18% by weight of a pigment;

from 30% to 58%, preferably from 35% to 52% and more preferably from 38% to 45% by weight of a filler; and from 10% to 40%, preferably from 15% to 35% and more preferably from 20% to 30% by weight of deionized water.

Preferably, the dispersant used in the powder slurry is an anionic, substantially viscosity-reducing dispersant. Further preferably, the dispersant is BYK-190.

Preferably, the defoamer used in the powder slurry is as defined above for the defoamer used in Component (A).

Preferably, the cosolvent used in the powder slurry is at least one of propylene glycol methyl ether, dipropylene glycol butyl ether and dipropylene glycol methyl ether.

Preferably, the anti-settling agent used in the powder slurry is an organic montmorillonite anti-settling agent, such as at least one of ELEMENTIS BENTONE LT, DE, BYK-WX, and the like.

Preferably, the anti-rusting pigment used in the powder slurry is at least one of aluminum tripolyphosphate, zinc phosphate and iron zinc phosphate.

The pigment used in the powder slurry is at least one of titanium dioxide and iron oxide black.

Preferably, the filler used in the powder slurry is a mixture of a filler with harder texture and a filler with softer texture which are compounded according to the weight ratio of 1 to 3:1; wherein the filler with harder texture is at least one of calcium carbonate and barium sulfate; the filler with softer texture is at least one of talc and kaolin.

In another embodiment, the polyisocyanate in Component (B) is at least one selected from a group consisting of aliphatic, aromatic and cycloaliphatic diisocyanates and polyisocyanates, and the isocyanurates, biurets, allophanates and uretdiones thereof, preferably the aliphatic diisocyanates.

Examples of conventional diisocyanates are aliphatic diisocyanates, such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate or 3 (or 4), 8 (or 9)bis(isocyanatomethyl) tricyclo[5.2.1.$0^{2,6}$]decane isomer mixtures, cycloaliphatic diisocyanates, such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethylcyclohexane) (isophorone diisocyanate), 1,3- or 1,4-bis(isocyanatomethyl)cyclohexane or 2,4- or 2,6-diisocyanato-1-methyl-cyclohexane, and aromatic diisocyanates, such as toluene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, biphenylene 4,4'-diisocyanate, 4,4'-diisocyanato-3,3'-dimethylbiphenyl, 3-methyl-diphenylmethane 4,4'-diisocyanate, tetramethylxylylene diisocyanate, 1,4-diisocyanatobenzene or 4,4'-diisocyanato-diphenyl ether.

Preferably, said diisocyanates are at least one selected from a group consisting of hexamethylene diisocyanate, 1,3-bis(isocyanatomethyl)cyclohexane, isophorone diisocyanate and di(isocyanatocyclohexyl)methane.

Suitable polyisocyanates are polyisocyanates having isocyanurate groups, uretdione diisocyanates, polyisocyanates having biuret groups, polyisocyanates having urethane or allophanate groups, polyisocyanates comprising oxadiazinetrione groups, uretonimine-modified polyisocyanates of linear or branched $C_4$-$C_{20}$-alkylene diisocyanates, cycloaliphatic diisocyanates having altogether 6 to 20 carbon atoms or aromatic diisocyanates having altogether 8 to 20 carbon atoms, or mixtures thereof.

The diisocyanates and polyisocyanates which may be used preferably have a content of isocyanate groups (calculated as NCO, molecular weight=42) of from 20 to 22% by weight, based on the di- and polyisocyanate (mixture).

Aliphatic or cycloaliphatic diisocyanates and polyisocyanates are preferred, for example the forementioned aliphatic or cycloaliphatic diisocyanates, or mixtures thereof.

More preferably, said polyisocyanates are at least one selected from groups (1) to (6):

(1) Polyisocyanates of aromatic, aliphatic and/or cycloaliphatic diisocyanates, which polyisocyanates have isocyanurate groups. Particularly preferred here are the corresponding aliphatic and/or cycloaliphatic isocyanatoisocyanurates and in particular those based on hexamethylene diisocyanate and isophorone diisocyanate. The present isocyanurates are in particular trisisocyanatoalkyl- or trisisocyanatocycloalkyl isocyanurates, which are cyclic trimers of the diisocyanates, or mixtures with their higher homologs having more than one isocyanurate ring. The isocyanatoisocyanurates have in general an NCO content of from 10 to 30% by weight, in particular from 15 to 25% by weight, and an average NCO functionality of from 3 to 4.5.

(2) Uretdione diisocyanates having aromatically, aliphatically and/or cycloaliphatically bonded isocyanate groups, preferably aliphatically and/or cycloaliphatically bonded isocyanate groups, and in particular those derived from hexamethylene diisocyanate and isophorone diisocyanate. Uretdione diisocyanates are cyclic dimerization products of diisocyanates.

The uretdione diisocyanates can be used in the formulations as the sole component or as a mixture with other polyisocyanates, in particular those mentioned under 1).

(3) Polyisocyanates having biuret groups and having aromatically, cycloaliphatically or aliphatically bonded, preferably cycloaliphatically or aliphatically bonded, isocyanate groups, in particular tris(6-isocyanatohexyl)biuret or mixtures thereof with its higher homologs. These polyisocyanates having biuret groups generally have an NCO content of from 18 to 25% by weight and an average NCO functionality from 3 to 4.5.

(4) Polyisocyanates having urethane and/or allophanate groups and having aromatically, aliphatically or cycloaliphatically bonded, preferably aliphatically or cycloaliphatically bonded, isocyanate groups, as can be obtained, for example, by reaction of excess amounts of hexamethylene diisocyanate or of isophorone diisocyanate with polyhydric alcohols, such as, for example, trimethylolpropane, neopentylglycol, pentaerythritol, 1,4-butanediol, 1,6-hexanediol, 1,3-propanediol, ethylene glycol, diethylene glycol, glycerol, 1,2-dihydroxypropane or mixtures thereof, preferably 2-hydroxyethyl (meth)acrylate. These polyisocyanates having urethane and/or allophanate groups generally have an NCO content of from 12 to 20% by weight and an average NCO functionality of at least 2, preferably at least 2.1 and particularly preferably from 2.5 to 3.

(5) Polyisocyanates comprising oxadiazinetrione groups, preferably derived from hexamethylene diisocyanate or isophorone diisocyanate. Polyisocyanates comprising such oxadiazinetrione groups can be prepared from diisocyanate and carbon dioxide. However, it may be appropriate to take into account the abovementioned content of oxadiazinetrione groups.

(6) Uretonimine-modified polyisocyanates.

Said polyisocyanates could be mixed with diisocyanates.

Preferably, the cosolvent for Component (B) is at least one selected from a group consisting of propylene glycol methyl ether acetate, propylene glycol diacetate and ethylene glycol butyl ether acetate. Further preferably, the cosolvent of Component (B) is a combination of propylene glycol methyl ether acetate and propylene glycol diacetate.

Preferably, the adhesion promoters used in Component (B) are silane coupling agents, such as Glymo, KH 560.

In another aspect, the present invention provides a method of preparing the invented primer composition. It can be prepared by conventional mixing methods such as stirring, milling, extruding etc. The invented primer composition is a two-component composition and the paint composition and the hardener composition are prepared and stored separately and will be mixed shortly before application. Besides Components (A) and (B) that are essential to the invention, this paint composition generally comprises any adjuvants and/or coatings additives that may be present. This paint composition is then admixed with the hardener composition, shortly before the primer composition is applied to a substrate.

In another aspect, the present invention provides a primer layer obtained by curing the waterborne polyurethane-epoxy resin based primer composition according to the invention on substrates.

In another aspect, the present invention provides a method of curing the waterborne polyurethane-epoxy resin based primer composition according to the invention on substrates, wherein the curing temperature is no more than 80° C., preferably no more than 60° C. and more preferably from 15° C. to 60° C.

Curing is meant the conversion of coating compositions, applied onto a substrate, into a ready-to-use state, in other words, into a state in which the coated articles can be transported, stored and intendedly used. Said curing is achieved by chemical reactions of functional groups of components put into the mixture. More specifically, said chemical reactions take place between hydroxyl groups of the hydroxyl functional acrylic-epoxy resin of Component (A) and isocyanate groups of the polyisocyanate of Component (B).

It is also possible to employ thermal curing devices and/or convection methods, for examples, tunnel ovens, IR (Infrared Spectroscopy) and NIR (Near Infrared Spectroscopy) heat radiators etc. These devices may also be combined with one another and the curing process may control curing temperatures by using convection.

The primer layer in each case may have a dry film thickness of, for example, from 10 to 100 μm, preferably from 30 to 70 μm and more preferably from 40 to 50 μm.

The primer layer can be applied onto any desired substrates. The substrates may be any applicable materials and their combinations. Preferably, the substrates are made of metals such as steel and aluminum or plastics such as epoxy resin-based plastics which may be reinforced by given glass fiber, aramid fiber, carbon fiber, a natural fiber such as hemp or sisal and/or glass fiber. The substrates may have any desired shapes and sizes.

The primer composition can be applied onto large scale of substrates and cured at room temperature (around 20° C. to 30° C.), which saves considerable energy (i.e. heating) if prior art technologies are used.

In another aspect, the present invention provides a method of preparing multiple coating layers, comprising steps of i. applying the waterborne polyurethane-epoxy resin based primer composition according to the invention onto the substrates;
ii. applying a basecoat onto the primer layer;
iii. optionally applying a clearcoat onto the basecoat layer;
iv. curing all layers simultaneously.

The primer composition could be applied onto substrates by methods known to persons skilled in the art such as spraying, rolling, brushing, pouring etc. And preferably the primer coating is applied by brushing or spraying (airless, mixed with air, compressed air, hot spraying etc.).

In a further aspect, the present invention provides cured multiple coating layers obtained or obtainable by said method of preparing multiple coating layers.

In one embodiment, the present invention provides a method of preparing multiple coating layers, comprising steps of:

(1) uniformly dispersing deionized water, a cosolvent for the powder slurry, a dispersant and a defoamer for the powder slurry, adding an anti-settling agent, a filler, an anti-rusting pigment and a pigment, dispersing at a linear speed of 6 to 8 m/s until the slurry is uniform and flowable, and grinding with a sand mill until the fineness is less than 25 μm to obtain the powder slurry of Component (A);
(2) after uniformly mixing the hydroxyl functional acrylic-epoxy resin, the petroleum resin, deionized water and the cosolvent for Component (A), slowly adding the powder slurry prepared in the step (1), uniformly dispersing, then adding the defoamer for Component (A), the substrate wetting agent, the thickener and the flash rusting inhibitor, uniformly stirring and dispersing, filtering and discharging to obtain Component (A) of the waterborne polyurethane-epoxy resin based primer composition; and
(3) uniformly stirring and dispersing the polyisocyanate, the cosolvent for Component (B) and the adhesion promoter to obtain Component (B) of the waterborne polyurethane-epoxy resin based primer composition;

wherein the application comprising the following steps: uniformly mixing Component (A) and Component (B) according to a weight ratio of 2:1 to 15:1, adding deionized water to adjust the viscosity to 30 to 35 s (T-4 cup, 23° C.), spraying the mixture on a sand-blasting plate, standing for 20 min at 25° C., and spraying a waterborne bi-component polyurethane topcoat to obtain the (polyurethane-epoxy resin based primer+polyurethane topcoat) film with excellent performance.

The invention is illustrated by following examples.

EXAMPLES

Materials

Resin: Hydroxyl acrylic-epoxy resin with the following repeat unit, with an epoxy equivalent weight of 1500 to 1600 g/eq and a T-4 cup viscosity of 50 to 70 s (GB/T1723);

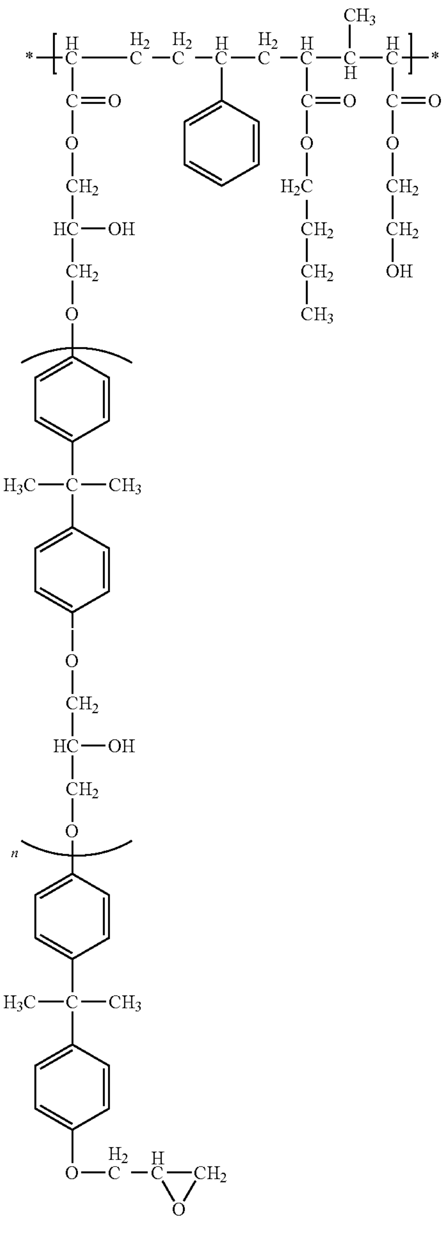

Petroleum resin: Novares W, Rütgers;
Epoxy resin: Valspar CWED0013;
Polyisocyanate: XP2655, Covestro;
Cosolvent: Dipropylene glycol methyl ether, Propylene glycol butyl ether, Dipropylene glycol butyl ether, Trimethylbenzene, Tetramethylbenzene, Propylene glycol methyl ether acetate, Propylene glycol diacetate, Ethylene glycol butyl ether acetate, Dow Chemical;
Dispersant: BYK-190, BYK;
Defoamer: TEGO-830, TEGO;

Substrate wetting agent: TEGO-410, TEGO;
Thickener: TEGO-3030, TEGO;
Anti-settling agent: DE, Elementis;
Flash rusting inhibitor: Flash-X-150, HALOX;
Adhesion promoter: Glymo, Evonik;
Antirusting pigment: Aluminum tripolyphosphate, Zinc phosphate, Guangxi Zhuang Autonomous Region Institute of Chemical Engineering;
Pigment: R-706 Titanium dioxide powder, DuPont; 4330 Iron oxide black, Bayferrox;
Filler: Barium sulfate, Sachtleben; Talc, Haicheng Pinyang talc mining Co., Ltd;

Test Methods

Test methods are shown in Table 2 and apply to Tables 4, 6, 8 and 10.

Preparation of Primer Composition and Cured Layers (The Amounts of the Components and Materials are Shown in Tables 1 to 10)

(1) After uniformly dispersing deionized water, dipropylene glycol methyl ether, BYK-190 and TEGO-830, adding DE, barium sulfate, talc, aluminum tripolyphosphate, zinc phosphate, R-706 titanium dioxide and 4330 iron oxide black powder, dispersing at a linear speed of 6 to 8 m/s until the slurry is uniform and flowable, and then grinding with a sand mill until the fineness is less than 25 μm to obtain the powder slurry of Component (A);

(2) uniformly mixing hydroxyl functional acrylic-epoxy resin, Novares W, deionized water, propylene glycol methyl ether, propylene glycol butyl ether, dipropylene glycol butyl ether and trimethylbenzene, slowly adding the powder slurry prepared in the step (1), uniformly dispersing, then adding TEGO-830, TEGO-410, TEGO-3030 and Flash-X-150, uniformly stirring and dispersing, filtering and discharging to obtain Component (A) of the waterborne polyurethane-epoxy resin based primer composition;

(3) uniformly stirring and dispersing XP2655, propylene glycol methyl ether acetate, propylene glycol diacetate and Glymo to obtain Component (B) of the waterborne polyurethane-epoxy resin based primer composition;

wherein the application comprising the following steps: uniformly mixing Component (A) and Component (B) according to a weight ratio of 5:1, adding deionized water to adjust the viscosity to 30 to 35 s (T-4 cup, 23° C.), spraying the mixture on a sand-blasting plate, standing the sand-blasting plate for 20 min at 25° C., and spraying a waterborne bi-component polyurethane topcoat (Valspar CWKY0239) to obtain the (polyurethane-epoxy resin based primer+polyurethane topcoat) film with excellent performance.

Example 1

TABLE 1

Formulations of waterborne polyurethane-epoxy resin based primer composition by changing the amount of hydroxyl funtional acrylic-epoxy resin

| | | Formulation No./weight percentage (wt %) | | | |
|---|---|---|---|---|---|
| | Materials | 1 (Comparative) | 2 | 3 | 4 |
| Powder slurry formulation | Deionized water | 25 | 25 | 25 | 25 |
| | Dipropylene glycol methyl ether | 4 | 4 | 4 | 4 |
| | BYK-190 | 2 | 2 | 2 | 2 |
| | TEGO-830 | 0.4 | 0.4 | 0.4 | 0.4 |
| | DE | 0.6 | 0.6 | 0.6 | 0.6 |
| | Barium sulfate | 30 | 30 | 30 | 30 |
| | Talcum dioxide powder | 11 | 11 | 11 | 11 |
| | Aluminium tripolyphosphate | 5 | 5 | 5 | 5 |
| | Zinc phosphate | 5 | 5 | 5 | 5 |
| | R-706 Titanium white powder | 15.5 | 15.5 | 15.5 | 15.5 |
| | 4330 Iron oxide black powder | 1.5 | 1.5 | 1.5 | 1.5 |
| Component (A) formulation | Hydroxyl acrylic-epoxy resin | 35 | 38 | 41 | 44 |
| | Novares W | 4 | 4 | 4 | 4 |
| | Deionized water | 6 | 3 | — | — |
| | Propylene glycol methyl ether | 0.5 | 0.5 | 0.5 | 0.5 |
| | Propylene glycol butyl ether | 1 | 1 | 1 | 1 |
| | Dipropylene glycol butyl ether | 2 | 2 | 2 | 2 |
| | Trimethylbenzene | 4 | 4 | 4 | 4 |
| | Tetramethylbenzene | — | — | — | — |
| | Powder slurry | 45 | 45 | 45 | 42 |
| | TEGO-830 | 0.5 | 0.5 | 0.5 | 0.5 |
| | TEGO-410 | 0.5 | 0.5 | 0.5 | 0.5 |
| | TEGO-3030 | 1 | 1 | 1 | 1 |
| | Flash-X-150 | 0.5 | 0.5 | 0.5 | 0.5 |
| Component (B) formulation | XP2655 | 48 | 48 | 48 | 48 |
| | Propylene glycol methyl ether acetate | 17 | 17 | 17 | 17 |
| | Propylene glycol diacetate | 30 | 30 | 30 | 30 |
| | Ethylene glycol butyl ether acetate | — | — | — | — |
| | Glymo | 5 | 5 | 5 | 5 |

TABLE 2

Relationship between the amount of hydroxyl funtional acrylic-epoxy resin and the performances of waterborne polyurethane-epoxy resin based primer composition

| Test items | | Test method | Formulation No. 1 (Comparative) | 2 | 3 | 4 |
|---|---|---|---|---|---|---|
| Thickness of primer film/μm | | / | 40-50 | 40-50 | 40-50 | 40-50 |
| Surface drying speed of primer/min (25° C./70% Humidity) | | GB/T 1728 | 30 | 20 | 16 | 21 |
| Thickness of topcoat film | | / | 40-50 | 40-50 | 40-50 | 40-50 |
| Baking conditions | | / | 70° C.*1 h | 70° C.*1 h | 70° C.*1 h | 70° C.*1 h |
| Adhesion force/grade | | GB/T 9286 | 3 | 2 | 1 | 1 |
| Flexibility | Impact resistance/cm | GB/T 1732 | 30 | 40 | 50 | 50 |
| | Bending test/mm | GB/T 6742 | 3 | 3 | 2 | 2 |
| | Cupping test/mm | GB/T 9753 | 4.3 | 4.7 | 5.2 | 5.5 |
| Water resistance (40° C. × 168 h, No bubbling and rusting) | | GB/T 5209 | unqualified | — | qualified | qualified |
| Gasoline resistance (6 h, No bubbling and wrinkling, Allowing slight discoloration) | | GB/T 9274 | qualified | qualified | qualified | qualified |
| Engine oil resistance (48 h, No obvious change of appearance) | | GB/T 9274 | qualified | qualified | qualified | qualified |
| Acid resistance (480 h, No bubbling and wrinkling, Allowing slight discoloration) | | GB/T 9274 | unqualified | qualified | qualified | qualified |
| Alkali resistance (480 h, No bubbling and wrinkling, Allowing slight discoloration) | | GB/T 9274 | qualified | qualified | qualified | qualified |
| Salt fog resistance (500 h, One-way corrosion at the scratch ≤2 mm, No bubbling, rusting, cracking and peeling phenomena in the unscratched area) | | GB/T1771 | unqualified | — | qualified | — |

The performances of the waterborne polyurethane-epoxy primer composition prepared from Formulation 1, Formulation 2, Formulation 3, and Formulation 4 are shown in Table 2. As can be seen from the Table, the primer of Formulation 1 has a slower drying speed, poorer adhesion force, and unqualified flexibility, water resistance, acid resistance and salt fog resistance; the primer of Formulation 2 has a superior drying speed, adhesion force, flexibility, water resistance and acid resistance, compared with that of Formulation 1; the primer of Formulation 3 has the optimal comprehensive performances; and the primer of Formulation 4 has a superior drying speed, adhesion force, flexibility, water resistance and acid resistance, compared with that of Formulation 1.

Example 2

TABLE 3

Formulations of waterborne polyurethane-epoxy resin based primer composition by changing the amount of petroleum resin

| | Materials | Formulation No./weight percentage (wt %) 5 (Comparative) | 6 | 7 | 8 (Comparative) |
|---|---|---|---|---|---|
| Powder slurry formulation | Deionized water | 25 | 25 | 25 | 25 |
| | Dipropylene glycol methyl ether | 4 | 4 | 4 | 4 |
| | BYK-190 | 2 | 2 | 2 | 2 |
| | TEGO-830 | 0.4 | 0.4 | 0.4 | 0.4 |
| | DE | 0.6 | 0.6 | 0.6 | 0.6 |
| | Barium sulfate | 30 | 30 | 30 | 30 |
| | Talcum dioxide powder | 11 | 11 | 11 | 11 |

TABLE 3-continued

Formulations of waterborne polyurethane-epoxy resin based primer composition by changing the amount of petroleum resin

| | Materials | 5 (Comparative) | 6 | 7 | 8 (Comparative) |
|---|---|---|---|---|---|
| | | Formulation No./weight percentage (wt %) | | | |
| Component (A) formulation | Aluminium tripolyphosphate | 5 | 5 | 5 | 5 |
| | Zinc phosphate | 5 | 5 | 5 | 5 |
| | R-706 Titanium white powder | 15.5 | 15.5 | 15.5 | 15.5 |
| | 4330 Iron oxide black powder | 1.5 | 1.5 | 1.5 | 1.5 |
| | Hydroxyl acrylic-epoxy resin | 41 | 41 | 41 | 41 |
| | Petroleum resin | 2 | 4 | 6 | 8 |
| | Propylene glycol methyl ether | 0.5 | 0.5 | 0.5 | 0.5 |
| | Propylene glycol butyl ether | 1 | 1 | 1 | 1 |
| | Dipropylene glycol butyl ether | 2 | 2 | 2 | 2 |
| | Trimethylbenzene | 4 | 4 | 4 | 4 |
| | Tetramethylbenzene | — | — | — | — |
| | Powder slurry | 47 | 45 | 43 | 41 |
| | TEGO-830 | 0.5 | 0.5 | 0.5 | 0.5 |
| | TEGO-410 | 0.5 | 0.5 | 0.5 | 0.5 |
| | TEGO-3030 | 1 | 1 | 1 | 1 |
| | Flash-X-150 | 0.5 | 0.5 | 0.5 | 0.5 |
| Component (B) formulation | XP2655 | 48 | 48 | 48 | 48 |
| | Propylene glycol methyl ether acetate | 17 | 17 | 17 | 17 |
| | Propylene glycol diacetate | 30 | 30 | 30 | 30 |
| | Ethylene glycol butyl ether acetate | — | — | — | — |
| | Glymo | 5 | 5 | 5 | 5 |

TABLE 4

Relationship between the amount of petroleum resin and the performances of waterborne polyurethane-epoxy resin based primer composition

| Test items | | 5 (Comparative) | 6 | 7 | 8 (Comparative) |
|---|---|---|---|---|---|
| | | Formulation No. | | | |
| Thickness of primer film/μm | | 40-50 | 40-50 | 40-50 | 40-50 |
| Surface drying speed of primer/min (25° C./70% Humidity) | | 30 | 16 | 13 | 9 |
| Thickness of topcoat film | | 40-50 | 40-50 | 40-50 | 40-50 |
| Baking conditions | | 70° C.*1 h | 70° C.*1 h | 70° C.*1 h | 70° C.*1 h |
| Adhesion force/grade | | 3 | 1 | 2 | 3 |
| Flexibility | Impact resistance/cm | 30 | 50 | 40 | 30 |
| | Bending test/mm | 3 | 2 | 2 | 3 |
| | Cupping test/mm | 3.3 | 5.2 | 4.1 | 3.5 |
| Water resistance (40° C. × 168 h, No bubbling and rusting) | | unqualified | qualified | — | unqualified |
| Gasoline resistance (6 h, No bubbling and wrinkling, Allowing slight discoloration) | | qualified | qualified | qualified | qualified |
| Engine oil resistance (48 h, No obvious change of appearance) | | qualified | qualified | qualified | qualified |
| Acid resistance (480 h, No bubbling and wrinkling, Allowing slight discoloration) | | unqualified | qualified | qualified | unqualified |
| Alkali resistance (480 h, No bubbling and wrinkling, Allowing slight discoloration) | | qualified | qualified | qualified | qualified |
| Salt fog resistance (500 h, One-way corrosion at the scratch ≤2 mm, No bubbling, rusting, cracking and peeling phenomena in the unscratched area) | | unqualified | qualified | — | unqualified |

The performances of the waterborne polyurethane-epoxy primer composition prepared from Formulation 5, Formulation 6, Formulation 7, and Formulation 8 are shown in Table 4. As can be seen from the Table, the primer of Formulation 5 has a slower drying speed, poorer adhesion force, and unqualified flexibility, water resistance, acid resistance and salt fog resistance; the primer of Formulation 8 has a poorer adhesion force, and unqualified flexibility, water resistance, acid resistance and salt fog resistance; the primer of Formulation 6 has the optimal comprehensive performances; and the primer of Formulation 7 has a superior drying speed, adhesion force, flexibility and acid resistance, compared with that of Formulation 5, and a superior adhesion force, flexibility and acid resistance, compared with that of Formulation 8.

Example 3

TABLE 5

Formulations of waterborne polyurethane-epoxy resin based primer composition by changing the cosolvent type of Component (A)

| | Materials | Formulation No./weight percentage (wt %) 9 (Comparative) | 10 | 11 (Comparative) | 12 |
|---|---|---|---|---|---|
| Powder slurry formulation | Deionized water | 25 | 25 | 25 | 25 |
| | Dipropylene glycol methyl ether | 4 | 4 | 4 | 4 |
| | BYK-190 | 2 | 2 | 2 | 2 |
| | TEGO-830 | 0.4 | 0.4 | 0.4 | 0.4 |
| | DE | 0.6 | 0.6 | 0.6 | 0.6 |
| | Barium sulfate | 30 | 30 | 30 | 30 |
| | Talcum dioxide powder | 11 | 11 | 11 | 11 |
| | Aluminium tripolyphosphate | 5 | 5 | 5 | 5 |
| | Zinc phosphate | 5 | 5 | 5 | 5 |
| | R-706 Titanium white powder | 15.5 | 15.5 | 15.5 | 15.5 |
| | 4330 Iron oxide black powder | 1.5 | 1.5 | 1.5 | 1.5 |
| Component (A) formulation | Hydroxyl acrylic-epoxy resin | 41 | 41 | 41 | 41 |
| | Petroleum resin | 4 | 4 | 4 | 4 |
| | Propylene glycol methyl ether | — | 0.5 | 0.5 | — |
| | Propylene glycol butyl ether | — | 1 | 1 | — |
| | Dipropylene glycol butyl ether | 5.5 | 2 | — | 1.5 |
| | Trimethylbenzene | 2 | 4 | 6 | — |
| | Tetramethylbenzene | — | — | — | 6 |
| | Powder slurry | 45 | 45 | 45 | 45 |
| | TEGO-830 | 0.5 | 0.5 | 0.5 | 0.5 |
| | TEGO-410 | 0.5 | 0.5 | 0.5 | 0.5 |
| | TEGO-3030 | 1 | 1 | 1 | 1 |
| | Flash-X-150 | 0.5 | 0.5 | 0.5 | 0.5 |
| Component (B) formulation | XP2655 | 48 | 48 | 48 | 48 |
| | Propylene glycol methyl ether acetate | 17 | 17 | 17 | 17 |
| | Propylene glycol diacetate | 30 | 30 | 30 | 30 |
| | Ethylene glycol butyl ether acetate | — | — | — | — |
| | Glymo | 5 | 5 | 5 | 5 |

TABLE 6

Relationship between the cosolvent type for Component (A) and the performances of waterborne polyurethane-epoxy primer composition

| | Test items | Formulation No. 9 (Comparative) | 10 | 11 (Comparative) | 12 |
|---|---|---|---|---|---|
| | Thickness of primer film/μm | 40-50 | 40-50 | 40-50 | 40-50 |
| | Surface drying speed of primer/min (25° C./70% Humidity) | 40 | 16 | 10 | 25 |
| | Thickness of topcoat film | 40-50 | 40-50 | 40-50 | 40-50 |
| | Baking conditions | 70° C.*1 h | 70° C.*1 h | 70° C.*1 h | 70° C.*1 h |
| | Adhesion force/grade | 3 | 1 | 3 | 2 |
| Flexibility | Impact resistance/cm | 30 | 50 | 30 | 40 |
| | Bending test/mm | 3 | 2 | 3 | 3 |
| | Cupping test/mm | 3.5 | 5.2 | 3.6 | 4.3 |
| | Water resistance (40° C. × 168 h, No bubbling and rusting) | unqualified | qualified | unqualified | — |
| | Gasoline resistance (6 h, No bubbling and wrinkling, Allowing slight discoloration) | unqualified | qualified | qualified | qualified |
| | Engine oil resistance (48 h, No obvious change of appearance) | qualified | qualified | qualified | qualified |
| | Acid resistance (480 h, No bubbling and wrinkling, Allowing slight discoloration) | unqualified | qualified | unqualified | — |

TABLE 6-continued

Relationship between the cosolvent type for Component (A) and the performances of waterborne polyurethane-epoxy primer composition

| Test items | Formulation No. 9 (Comparative) | 10 | 11 (Comparative) | 12 |
|---|---|---|---|---|
| Alkali resistance (480 h, No bubbling and wrinkling, Allowing slight discoloration) | unqualified | qualified | qualified | qualified |
| Salt fog resistance (500 h, One-way corrosion at the scratch ≤2 mm, No bubbling, rusting, cracking and peeling phenomena in the unscratched area) | unqualified | qualified | unqualified | — |

The performances of the waterborne polyurethane-epoxy primer composition prepared from Formulation 9, Formulation 10, Formulation 11, and Formulation 12 are shown in Table 6. As can be seen from the Table, the primer of Formulation 9 has a slower drying speed, poorer adhesion force, and unqualified flexibility, water resistance, gasoline resistance, acid resistance, alkali resistance and salt fog resistance; the primer of Formulation 10 has the optimal comprehensive performances; the primer of Formulation 11 has a poorer adhesion force, and unqualified flexibility, water resistance, acid resistance and salt fog resistance; and the primer of Formulation 12 has the optimal drying speed, adhesion force, flexibility, gasoline resistance and alkali resistance, compared with that of Formulation 9, and a superior adhesion force and flexibility, compared with that of Formulation 11.

Example 4

TABLE 7

Formulations of waterborne polyurethane-epoxy resin based primer composition by changing the cosolvent type for Component (B)

| | Materials | Formulation No./weight percentage (wt %) 13 (Comparative) | 14 (Comparative) | 15 (Comparative) | 16 |
|---|---|---|---|---|---|
| Powder slurry formulation | Deionized water | 25 | 25 | 25 | 25 |
| | Dipropylene glycol methyl ether | 4 | 4 | 4 | 4 |
| | BYK-190 | 2 | 2 | 2 | 2 |
| | TEGO-830 | 0.4 | 0.4 | 0.4 | 0.4 |
| | DE | 0.6 | 0.6 | 0.6 | 0.6 |
| | Barium sulfate | 30 | 30 | 30 | 30 |
| | Talcum dioxide powder | 11 | 11 | 11 | 11 |
| | Aluminium tripolyphosphate | 5 | 5 | 5 | 5 |
| | Zinc phosphate | 5 | 5 | 5 | 5 |
| | R-706 Titanium white powder | 15.5 | 15.5 | 15.5 | 15.5 |
| | 4330 Iron oxide black powder | 1.5 | 1.5 | 1.5 | 1.5 |
| Component (A) formulation | Hydroxyl acrylic-epoxy resin | 41 | 41 | 41 | 41 |
| | Petroleum resin | 4 | 4 | 4 | 4 |
| | Propylene glycol methyl ether | 0.5 | 0.5 | 0.5 | 0.5 |
| | Propylene glycol butyl ether | 1 | 1 | 1 | 1 |
| | Dipropylene glycol butyl ether | 2 | 2 | 2 | 2 |
| | Trimethylbenzene | 4 | 4 | 4 | 4 |
| | Tetramethylbenzene | — | — | — | — |
| | Powder slurry | 45 | 45 | 45 | 45 |
| | TEGO-830 | 0.5 | 0.5 | 0.5 | 0.5 |
| | TEGO-410 | 0.5 | 0.5 | 0.5 | 0.5 |
| | TEGO-3030 | 1 | 1 | 1 | 1 |
| | Flash-X-150 | 0.5 | 0.5 | 0.5 | 0.5 |
| Component (B) formulation | XP2655 | 48 | 48 | 48 | 48 |
| | Propylene glycol methyl ether acetate | 47 | — | — | 17 |
| | Propylene glycol diacetate | — | 47 | — | 30 |
| | Ethylene glycol butyl ether acetate | — | — | 47 | — |
| | Glymo | 5 | 5 | 5 | 5 |

TABLE 8

Relationship between the cosolvent type for Component (B) and the performances of waterborne polyurethane-epoxy primer composition

| Test items | | Formulation No. 13 (Comparative) | 14 (Comparative) | 15 (Comparative) | 16 |
|---|---|---|---|---|---|
| Thickness of primer film/μm | | 40-50 | 40-50 | 40-50 | 40-50 |
| Surface drying speed of primer/min (25° C./70% Humidity) | | 10 | 38 | 12 | 16 |
| Thickness of topcoat film | | 40-50 | 40-50 | 40-50 | 40-50 |
| Baking conditions | | 70° C.*1 h | 70° C.*1 h | 70° C.*1 h | 70° C.*1 h |
| Adhesion force/grade | | 3 | 3 | 3 | 1 |
| Flexibility | Impact resistance/cm | 30 | 30 | 30 | 50 |
| | Bending test/mm | 3 | 3 | 3 | 2 |
| | Cupping test/mm | 3.0 | 3.2 | 3.4 | 5.2 |
| Water resistance (40° C. × 168 h, No bubbling and rusting) | | unqualified | unqualified | unqualified | qualified |
| Gasoline resistance (6 h, No bubbling and wrinkling, Allowing slight discoloration) | | unqualified | qualified | unqualified | qualified |
| Engine oil resistance (48 h, No obvious change of appearance) | | qualified | qualified | qualified | qualified |
| Acid resistance (480 h, No bubbling and wrinkling, Allowing slight discoloration) | | unqualified | unqualified | unqualified | qualified |
| Alkali resistance (480 h, No bubbling and wrinkling, Allowing slight discoloration) | | qualified | qualified | qualified | qualified |
| Salt fog resistance (500 h, One-way corrosion at the scratch ≤2 mm, No bubbling, rusting, cracking and peeling phenomena in the unscratched area) | | unqualified | unqualified | unqualified | qualified |

The performances of the waterborne polyurethane-epoxy primer composition prepared from Formulation 13, Formulation 14, Formulation 15, and Formulation 16 are shown in Table 8. As can be seen from the Table, the primer of Formulation 14 has a slower drying speed, poorer adhesion force, and unqualified flexibility, water resistance, gasoline resistance, acid resistance and salt fog resistance, the primer of Formulation 13 or 15 has a poorer adhesion force, and unqualified flexibility, water resistance, gasoline resistance, acid resistance and salt fog resistance; and the primer of Formulation 16 has the optimal comprehensive performances.

Example 5

TABLE 9

Waterborne polyurethane-epoxy resin based primer and epoxy primer compositions

| Materials | | Polyurethane-epoxy resin based primer (Formulation 16) | Epoxy primer (Comparative) |
|---|---|---|---|
| Powder slurry formulation | Deionized water | 25 | 25 |
| | Dipropylene glycol methyl ether | 4 | 4 |
| | BYK-190 | 2 | 2 |
| | TEGO-830 | 0.4 | 0.4 |
| | DE | 0.6 | 0.6 |
| | Barium sulfate | 30 | 30 |
| | Talcum dioxide powder | 11 | 11 |
| | Aluminium tripolyphosphate | 5 | 5 |
| | Zinc phosphate | 5 | 5 |
| | R-706 Titanium white powder | 15.5 | 15.5 |
| | 4330 Iron oxide black powder | 1.5 | 1.5 |
| Component (A) formulation | Hydroxyl acrylic-epoxy resin | 41 | — |
| | Epoxy resin | — | 45 |
| | Petroleum resin | 4 | — |
| | Propylene glycol methyl ether | 0.5 | 0.5 |
| | Propylene glycol butyl ether | 1 | 1 |
| | Dipropylene glycol butyl ether | 2 | 2 |
| | Trimethylbenzene | 4 | 4 |
| | Powder slurry | 45 | 45 |
| | TEGO-830 | 0.5 | 0.5 |

TABLE 9-continued

Waterborne polyurethane-epoxy resin based primer and epoxy primer compositions

| | Materials | Polyurethane-epoxy resin based primer (Formulation 16) | Epoxy primer (Comparative) |
|---|---|---|---|
| | TEGO-410 | 0.5 | 0.5 |
| | TEGO-3030 | 1 | 1 |
| | Flash-X-150 | 0.5 | 0.5 |
| Component (B) formulation | XP2655 | 48 | — |
| | Epoxy curing agent | — | 52 |
| | Propylene glycol methyl ether acetate | 17 | — |
| | Isopropyl alcohol | — | 17 |
| | Ethylene glycol butyl ether | — | 31 |
| | Propylene glycol diacetate | 30 | — |
| | Glymo | 5 | — |

TABLE 10

Comparison of the performances of "polyurethane-epoxy resin based primer + polyurethane topcoat" with "epoxy primer + polyurethane topcoat"

| | Test items | Polyurethane-epoxy resin based primer + polyurethane topcoat | Epoxy primer + polyurethane topcoat |
|---|---|---|---|
| | Thickness of primer film/μm | 40-50 | 40-50 |
| | Surface drying speed of primer/min (25° C./70% Humidity) | 16 | 25 |
| | Thickness of topcoat film | 40-50 | 40-50 |
| | Baking conditions | 70° C.*1 h | 70° C.*1 h |
| | Adhesion force/grade | 1 | 2 |
| Flexibility | Impact resistance/cm | 50 | 30 |
| | Bending test/mm | 2 | 3 |
| | Cupping test/mm | 5.2 | 3.2 |
| | Water resistance (40° C. × 168 h, No bubbling and rusting) | qualified | unqualified |
| | Gasoline resistance (6 h, No bubbling and wrinkling, Allowing slight discoloration) | qualified | qualified |
| | Engine oil resistance (48 h, No obvious change of appearance) | qualified | qualified |
| | Acid resistance (480 h, No bubbling and wrinkling, Allowing slight discoloration) | qualified | unqualified |
| | Alkali resistance (480 h, No bubbling and wrinkling, Allowing slight discoloration) | qualified | qualified |
| | Salt fog resistance (500 h, One-way corrosion at the scratch ≤2 mm, No bubbling, rusting, cracking and peeling phenomena in the unscratched area) | qualified | unqualified |

It is shown in Table 10 that when the polyurethane-epoxy resin based primer composition according to the present invention and the comparative epoxy primer are coated by the same polyurethane topcoat, the combination of "polyurethane-epoxy resin based primer+polyurethane topcoat" has a superior adhesion force, flexibility, water resistance, acid resistance and salt fog resistance. In conclusion, the waterborne polyurethane-epoxy resin based primer composition according to the present invention is more suitable for a wet-on-wet process.

The invention claimed is:

1. A waterborne polyurethane-epoxy resin based primer composition comprising:

(A) a paint composition comprising, based on the total weight of Component (A):

from 37% to 50% by weight of hydroxyl functional acrylic-epoxy resin, from 3% to 10% by weight of hydrocarbon resin containing at least one phenolic hydroxyl group, from 5% to 15% by weight of a cosolvent for Component (A), and from 30% to 50% by weight of powder slurry;

and (B) a hardener composition comprising, based on the total weight of Component (B):

from 40% to 60% by weight of a polyisocyanate, from 30% to 59% by weight of a cosolvent for Component (B), and from 1% to 10% by weight of adhesion promoter;

wherein the weight ratio of Component (A) to Component (B) is from 2 to 15.

2. The waterborne polyurethane-epoxy resin based primer composition according to claim 1, wherein said hydroxyl functional acrylic-epoxy resin in Component (A) is a copolymer of a glycidyl ether (meth)acrylate and at least one olefinic and/or aromatic monomer.

3. The waterborne polyurethane-epoxy resin based primer composition according to claim 2, wherein said glycidyl ether (meth)acrylate is a reaction product of glycidyl ether and (meth) acrylic acid.

4. The waterborne polyurethane-epoxy resin based primer composition according to claim 3, wherein said glycidyl ether is selected from the group consisting of aromatic glycidyl ether and aliphatic glycidyl ether.

5. The waterborne polyurethane-epoxy resin based primer composition according to claim 3, wherein said glycidyl ether is at least one selected from the group consisting of bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, 1,4-butanediol diglycidyl ether, 1,6-hexanediol diglycidyl ether, trimethylolpropane triglycidyl ether, pentaerythrityl tetraglycidyl ether, diglycidyl ether of polypropylene glycol, and diglycidyl ether of hydrogenated bisphenol A.

6. The waterborne polyurethane-epoxy resin based primer composition according to claim 2, wherein said olefinic and/or aromatic monomer is at least one selected from the group consisting of (meth)acrylic acid, (meth)acrylic ester other than glycidyl ether (meth)acrylate, α-methyl styrene, styrene, maleic anhydride, itaconic acid, and itaconic esters.

7. The waterborne polyurethane-epoxy resin based primer composition according to claim 1, wherein said hydroxyl functional acrylic-epoxy resin in Component (A) has a structure as illustrated in Formula (I):

Formula (I)

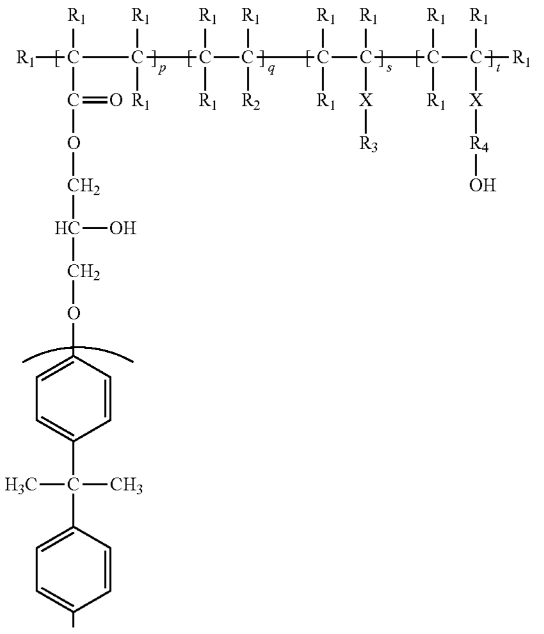

-continued

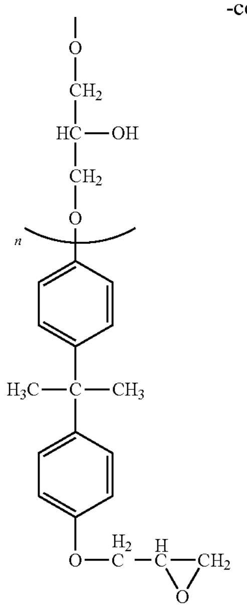

wherein $R_1$ is independently selected from the group consisting of hydrogen, methyl and an ethyl group; $R_2$ is selected from the group consisting of a substituted and an unsubstituted aryl group; $R_3$ is a $C_1$-$C_6$ alkyl group; $R_4$ is a $C_1$-$C_6$ alkylene group; X is selected from the group consisting of ester and ether segment; p, q, s, t are positive integers and the sum of p, q, s and t is from 4 to 120.

8. The waterborne polyurethane-epoxy resin based primer composition according to claim 7, wherein said hydroxyl functional acrylic-epoxy resin in Component (A) has a structure as illustrated in Formula (I), wherein p, q, s, t are equal positive integers and either p or q or s or tis from 1 to 30.

9. The waterborne polyurethane-epoxy resin based primer composition according to claim 1, wherein said hydroxyl functional acrylic-epoxy resin comprises hydroxyl groups in an amount of from 1.0% to 10.0% by weight based on the total weight of the hydroxyl functional acrylic-epoxy resin.

10. The waterborne polyurethane-epoxy resin based primer composition according to claim 1, wherein said hydroxy functional acrylic-epoxy resin has an epoxy equivalent in a range of from 500 to 2500 g/eq.

11. The waterborne polyurethane-epoxy resin based primer composition according to claim 1, wherein said hydroxy functional acrylic-epoxy resin has a T-4 cup viscosity of from 30 to 100 s.

12. The waterborne polyurethane-epoxy resin based primer composition according to claim 1, wherein said hydrocarbon resin containing at least one phenolic hydroxyl group is at least one selected from the group consisting of coumarone-indene resin, petroleum resin and terpene resin.

13. The waterborne polyurethane-epoxy resin based primer composition according to claim 1, wherein said cosolvent for Component (A) is a mixture of hydrophilic and lipophilic solvents in a ratio by weight of from 1 to 10, wherein said hydrophilic solvent is at least one selected from the group consisting of propylene glycol methyl ether, dipropylene glycol butyl ether and dipropylene glycol methyl ether, and said lipophilic solvent is at least one selected from the group consisting of propylene glycol butyl ether, trimethylbenzenes and tetramethylbenzenes.

14. The waterborne polyurethane-epoxy resin based primer composition according to claim 1, wherein said powder slurry of Component (A) comprises, based on the total weight of the powder slurry:

from 0.5% to 5% by weight of a dispersant;

from 0.05% to 2% by weight of a defoamer;

from 1% to 8% by weight of a cosolvent for the powder slurry;

from 0.1% to 1.2% by weight of an anti-settling agent;

from 5% to 18% by weight of an anti-rusting pigment;

from 13% to 21% by weight of a pigment;

from 30% to 58% by weight of a filler; and from 10% to 40% by weight of deionized water.

15. The waterborne polyurethane-epoxy resin based primer composition according to claim 1, wherein said polyisocyanate in Component (B) is at least one selected from the group consisting of aliphatic, aromatic and cycloaliphatic diisocyanates and polyisocyanates, isocyanurates, biurets, allophanates and uretdiones thereof.

16. The waterborne polyurethane-epoxy resin based primer composition according to claim 1, wherein said cosolvent for Component (B) is at least one selected from the group consisting of propylene glycol methyl ether acetate, propylene glycol diacetate and ethylene glycol butyl ether acetate.

17. A primer layer obtained by curing the waterborne polyurethane-epoxy resin based primer composition according to claim 1 on substrates.

18. A method of curing the waterborne polyurethane-epoxy resin based primer composition according to claim 1 on substrate, wherein the curing temperature is no more than 80° C.

19. A method of preparing multiple coating layers, comprising steps of i. applying the waterborne polyurethane-epoxy resin based primer composition according to claim 1 onto the substrate;

ii. applying a basecoat onto the primer layer;

iii. optionally applying a clearcoat onto the basecoat layer; and iv. curing all layers simultaneously.

20. Cured multiple coating layers obtained by the method according to claim 19.

* * * * *